US005186997A

United States Patent [19]

Vermeulen

[11] Patent Number: 5,186,997

[45] Date of Patent: Feb. 16, 1993

[54] DEVICE FOR THE ATTACHMENT OF A SHEET ONTO A BACKING

[76] Inventor: Peter Vermeulen, Merellaan 14, 2930 Brasschaat, Belgium

[21] Appl. No.: 633,621

[22] Filed: Dec. 28, 1990

[30] Foreign Application Priority Data

Dec. 29, 1989 [BE] Belgium .............................. 8901408

[51] Int. Cl.[5] .............................................. B32B 7/14

[52] U.S. Cl. ...................................... 428/99; 428/211; 428/354

[58] Field of Search ................. 428/99, 195, 198, 211, 428/354

[56] References Cited

U.S. PATENT DOCUMENTS 2,565,509 8/1951 Marcin ............................... 428/354
4,379,012 4/1983 Heymanns .......................... 428/354
4,460,634 7/1984 Hasegawa ........................... 428/124
4,582,737 4/1986 Torgerson .......................... 428/354
4,770,913 9/1988 Yamamoto ......................... 428/354

FOREIGN PATENT DOCUMENTS 2205243 5/1974 France .

*Primary Examiner*—Jenna L. Davis
*Attorney, Agent, or Firm*—Foley & Lardner

[57] ABSTRACT

Device for the attachment of a sheet onto a backing, characterized in that it principally consists of a strip (5); first attachment means (6) which connect the strip at well defined places directly or indirectly to the sheet (2); and second attachment means (7) which directly or indirectly connect the strip (5) to the backing (3) at places different from the first mentioned places, and with a certain distance (D) between them.

11 Claims, 3 Drawing Sheets

DEVICE FOR THE ATTACHMENT OF A SHEET ONTO A BACKING

This invention relates to a device for the attachment of a sheet onto a backing. More especially for the attachment of posters, photographs, drawings and similar onto a backing, either onto a sheet of paper, textile or plastic.

It is known that a poster, drawing or photograph can be glued to a backing for strength. The classic methods of attachment show the disadvantage that when rolling up such an assembly a slight displacement of the sheet occurs in relation to the backing, which is caused by the difference in the rolling up diameters.

Ultimately this results in the folding or wrinkling of either the top sheet, thus the poster, drawing or photograph, or of the backing.

The present invention relates to a device for the attachment of a sheet onto a backing whereby the aforementioned disadvantage does not occur, in other words a device which allows that a sheet attached to a backing can be rolled up without herewith wrinkling of the sheet nor of the backing occurs.

The invention can be utilized for different purposes. For example, the invention is particularly suitable for applying texts and images onto a tape which is wound to and fro between two rollers, so that the texts or images can be made visible at will. An example of such a device for showing several images is described in the French patent no. 2.205.243.

For this purpose the object of the present invention is a device for the attachment of a sheet onto a backing, with as characteristic that it principally consists of a strip; first attachment means which connect the strip at well defined places directly or indirectly to the sheet; and second attachment means which directly or indirectly connect the strip to the backing at places different from the first mentioned places, and with a certain distance between them.

Use is preferably made of a strip which by means of double sided adhesive tape, on the one hand, can be attached at well defined places onto the sheet and on the other hand is connected at well defined places to a wider tape, which in turn can be glued by means of a strip of double sided adhesive tape next to the sheet on the backing.

In order to show better the characteristics according to the present invention, a preferred embodiment is described hereafter, as example and without any restrictive character, with reference to the enclosed drawings in which.

Figure 1:
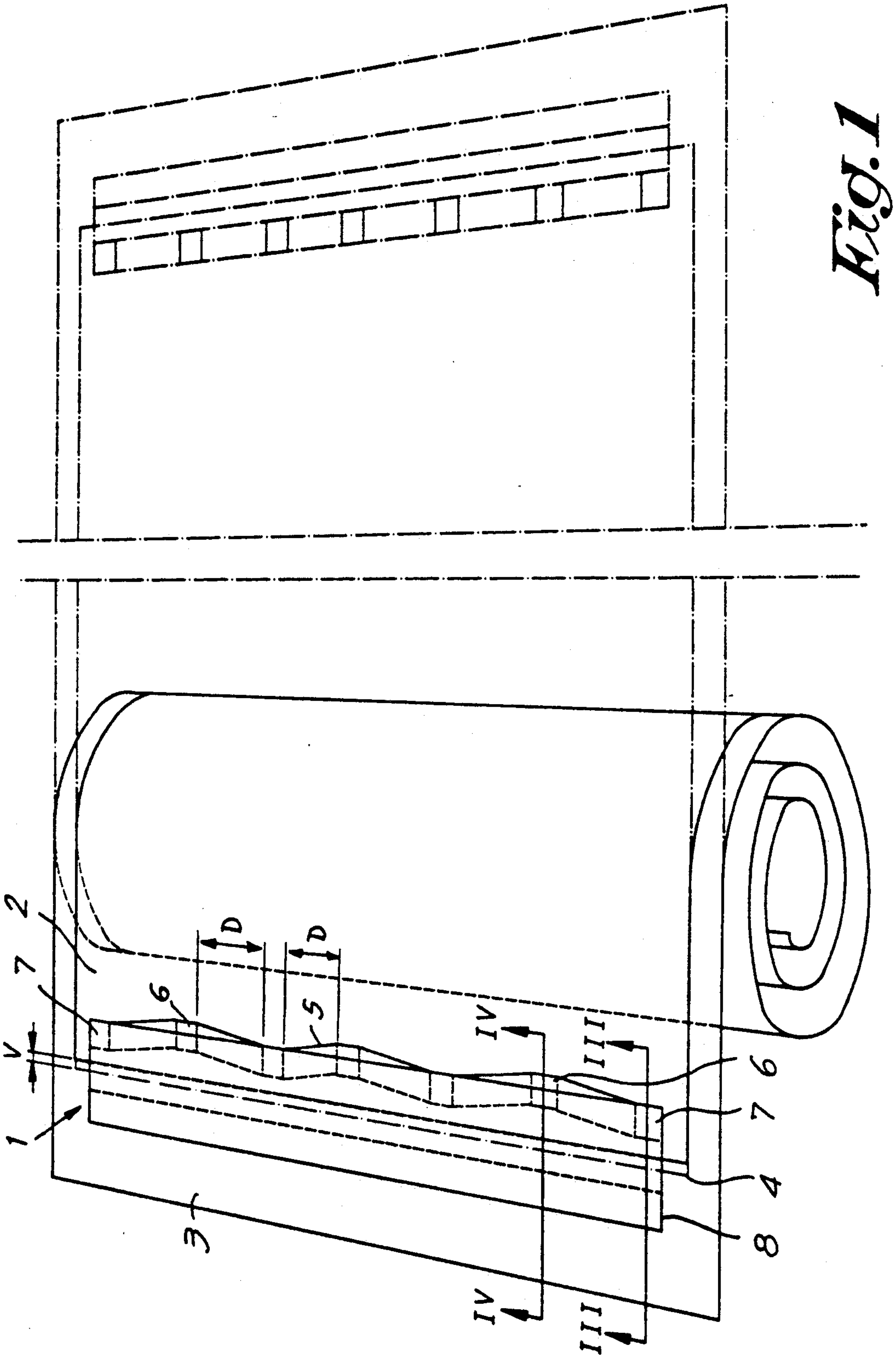
FIG. 1 shows schematically the attachment of a sheet onto a backing by means of a device according to the invention.
Figure 2:
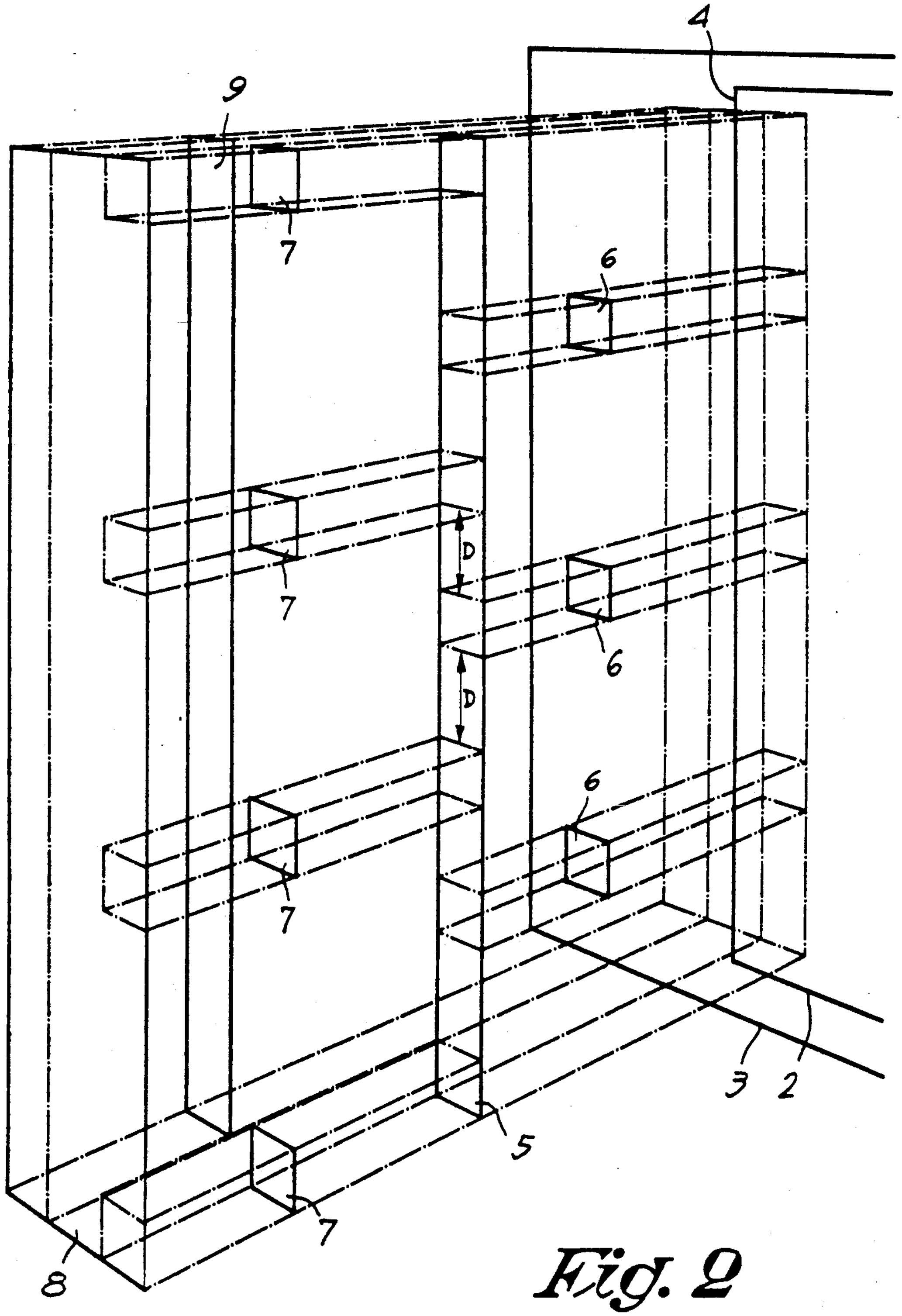
FIG. 2 shows the device from FIG. 1 in an exploded view.
Figure 3:
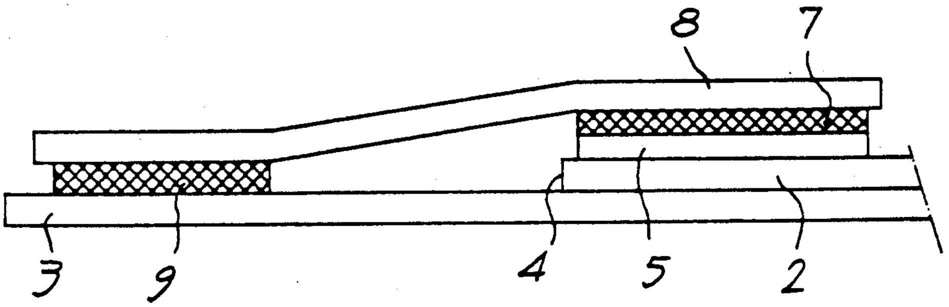
FIGS. 3 and 4 show sections respectively according to lines III—III and IV—IV in FIG. 1, whereby for the sake of clarity the various layers are represented with an exaggerated thickness.
Figure 4:
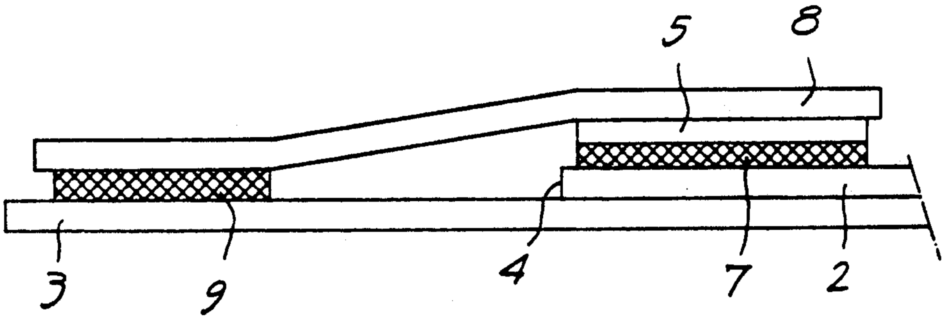

FIG. 1 shows a device 1 according to the invention with which a sheet 2 is installed on a backing 3.

The sheet 2 can hereby consist of a poster, photograph, drawing or similar, while the backing 3 forms a strengthening or has any other function. Both the sheet 2 and the backing 3 can consist of paper, textile, plastic, etc.

The device 1 according to the invention allows that the sheet 2 can be attached along one side 4 onto the backing 3. In order to achieve that the sheet 2 with the rolling up of the assembly can perform a displacement V in relation to the backing 3 the device according to the invention consists of a strip 5; first attachment means 6 which connect the strip 5 at well defined places directly or indirectly to the sheet 2; and second attachment means 7 which directly or indirectly connect the strip 5 to the backing 3 at places different from the first mentioned places, and with a certain distance D between them.

According to the preferred embodiment shown in FIGS. 1 through 4 the aforementioned strip 5 is directly attached onto the sheet 2 via the first attachment means 6, while it is glued via the second attachment means 7 to a tape 8, which shows nearly twice the width of the strip 5, and which is provided with third attachment means 9 next to the strip 5 which can work together with the backing 3 next to the side 4 of the sheet 2.

The first and second attachment means 6 and 7 each preferably consist of short pieces of double sided adhesive tape which are installed alternately along one side and the other of the strip 5. The aforementioned third attachment means 9 can consist of a strip of double sided adhesive tape.

Both the strip 5 and the tape 8 can consist of any foldable material whether paper, textile, plastic, etc.

The installation of the device 1 and with this the attachment of a sheet 2 onto a backing 3 can occur in various ways. In this manner it is for example possible to build up the assembly systematically by first laying the sheet 2 on the backing 3, subsequently gluing the pieces of double sided adhesive tape 6 onto the sheet 2 and the strip of double sided adhesive tape 7 onto the backing 3, after which successively the strip 5, the pieces of double sided adhesive tape 7 and the tape 8 are pressed on.

According to a variant all aforementioned elements 5, 6, 7, 8 and 9 can also first be joined together after which the assembly is installed on the sheet 2 and the backing 3.

It is clear that with the rolling up a local displacement of the strip 5 occurs, all of which such as shown in FIG. 1, with as advantage that neither the sheet 2, nor the backing 3 are damaged, for example are folded, with the rolling up. The device allows that posters, photographs or drawings which are glued onto a backing can be rolled up very compactly and without problems.

It is clear that the attachment according to the invention can equally be applied along one side and along both sides of the sheet 2.

The present invention is in no way restricted to the embodiment described as example and shown in the attached drawings, but such device for the attachment of a sheet onto a backing can be implemented in different variants without departing from the scope of the present invention.

What is claimed is:

1. Device for the attachment of a sheet onto a backing, comprising a strip (5); first attachment means (6) which connect the strip at a plurality of first well defined places directly or indirectly to the sheet (2); and second attachment means (7) which directly or indirectly connect the strip (5) to the backing (3) at a plurality of second places different from the first places, and with a predetermined distance (D) between the first and second places, such that there are a total of at least three of the first and second places, whereby the sheet and backing may be mutually displaced.

2. Device according to claim 1, wherein the strip further comprises a first and a second side, the first and second attachment means being provided alternately along the first and second side of the aforementioned strip (5).

3. Device according to claim 1, further comprising a tape (8) having a third attachment means next to the strip (5) which allow the tape (8) to be glued onto the backing (3), the strip (5) being attached via the aforementioned second attachment means (7) to the tape (8).

4. Device according to claim 3, wherein the third attachment means (9) consist of double sided adhesive tape.

5. Device according to claim 4, wherein the third attachment means (9) are produced in the form of a strip.

6. Device according to claim 1, wherein the first attachment means (6) consist of short pieces of double sided adhesive tape.

7. Device according to claim 1, wherein the second attachment means (7) consist of short pieces of double sided adhesive tape.

8. Device according to claim 1, wherein the aforementioned strip (5) consists of paper.

9. Device according to claim 3, wherein the tape (8) consists of paper.

10. Device according to claim 1, wherein the total number of places is at least five in number.

11. Device according to claim 1, wherein the total number of places is seven.

* * * * *